Figures 1, 2:
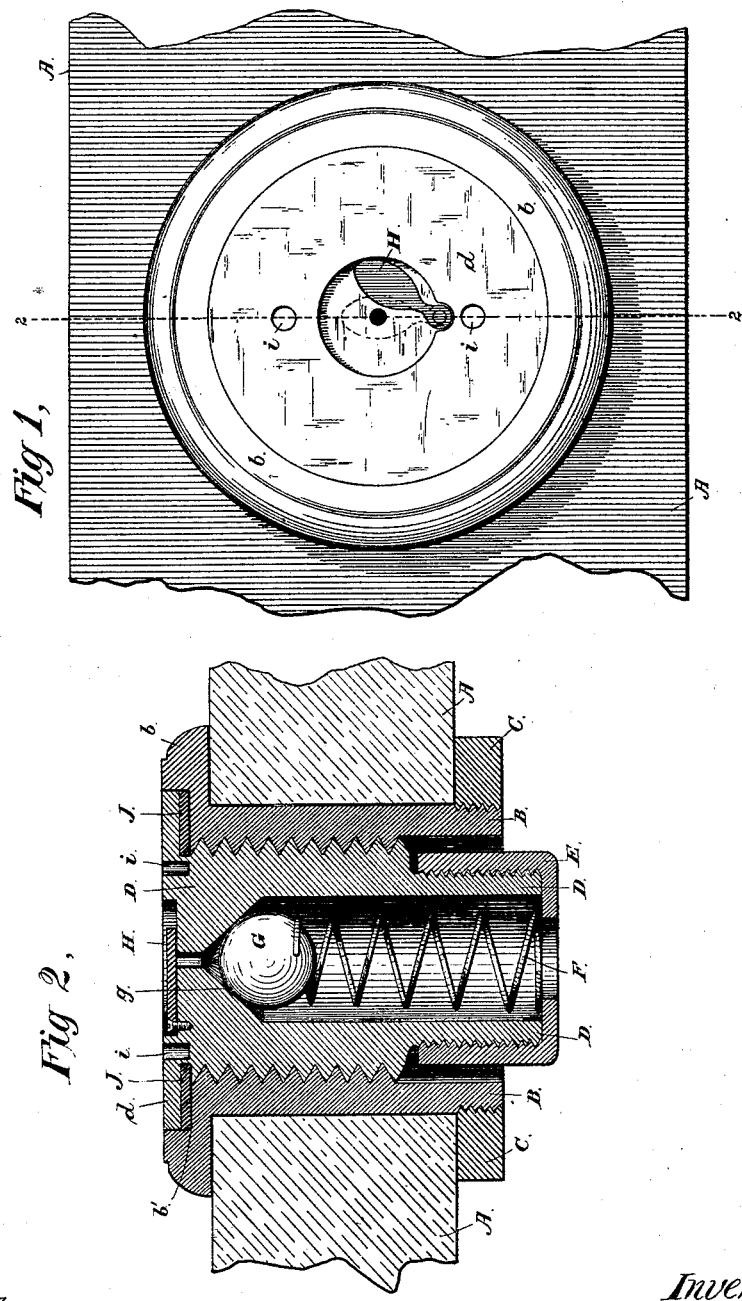

(No Model.)

B. CHAMBERLAIN.
Bung for Barrels.

No. 231,997.  Patented Sept. 7, 1880.

Attest:
Geo. T. Smallwood Jr.
Walter Allen

Inventor:
Blanchard Chamberlain
By Knight Bros
Attys.

UNITED STATES PATENT OFFICE.

BLANCHARD CHAMBERLAIN, OF BELLEFONTAINE, OHIO.

BUNG FOR BARRELS.

SPECIFICATION forming part of Letters Patent No. 231,997, dated September 7, 1880.

Application filed March 2, 1880. (No model.)

*To all whom it may concern:*

Be it known that I, BLANCHARD CHAMBERLAIN, residing at Bellefontaine, in the county of Logan and State of Ohio, have invented Improvements in Bungs for Barrels, of which the following is a specification.

The subject of my invention is a metallic bung consisting of a seat permanently secured within the bung-hole by means of a lock-nut, and having a threaded stopper provided with a gasket of rubber, and with a check-valve consisting of a rubber ball held to its seat by means of a spiral spring, the object of said check-valve being to prevent the escape of gas and to admit air when the pressure within the barrel is reduced below that of the atmosphere.

In the accompanying drawings, Figure 1 is a plan of my improved bung. Fig. 2 is a section of the same on the line 2 2, Fig. 1.

A represents a portion of the bung-stave of a barrel.

B is a socket, tube, or bushing set therein, constructed with an external flange, $b$, and secured by an internal nut, C.

The bushing B is internally threaded, as shown, and formed with an annular seat, $b'$, on its outer face for the reception of the bung proper, D, which consists of a stem threaded to fit the female thread of the bushing and an outer flange or shoulder, $d$, to fit upon the seat $b'$.

The inner end of the bung receives a cap, E, having an orifice in its head, and adapted to confine within the hollow stem of the bung a spiral spring, F, and a ball-valve, G, the latter closing outwardly against a concave seat, $g$, prepared for it within the outer head of the bung.

The orifice in the valve-seat $g$ is covered on the outside by a pivoted cap or stopper, H, to prevent the ingress of foreign matters during transportation.

The bung may be provided with any suitable means for screwing and unscrewing—as, for example, apertures, as shown at $i$ $i$, to receive a double-pointed screw-driver.

A gasket, J, of rubber is introduced beneath the flange $d$ of the bung upon the seat $b'$, to produce an air-tight closure.

In use the bushing or bung-seat B is inserted in an opening prepared for it in the bung-stave, and permanently secured by means of the lock-nut C, it being only necessary to screw out the bung D when the barrel is to be filled. The said bung, being replaced, constitutes with its automatic check-valve a barrel-vent of the most effective character.

Having thus described my invention, the following is what I claim as new and desire to secure by Letters Patent:

A vent-bung constructed with a packed external flange, $d$, and screw-thread for securing it in its seat, and a check-valve, F G, confined by a screw-cap, E, as and for the purpose set forth.

B. CHAMBERLAIN.

Witnesses:
OCTAVIUS KNIGHT,
WALTER ALLEN.